United States Patent [19]
Phillips

[11] Patent Number: 5,931,046
[45] Date of Patent: Aug. 3, 1999

[54] YOKE APPARATUS FOR RACK AND PINION

[75] Inventor: Edward H. Phillips, Troy, Mich.

[73] Assignee: Techco Corporation, Southfield, Mich.

[21] Appl. No.: 09/039,014

[22] Filed: Mar. 13, 1998

Related U.S. Application Data

[60] Provisional application No. 60/040,746, Mar. 13, 1997, and provisional application No. 60/043,430, Apr. 7, 1997.

[51] Int. Cl.[6] .................................................... F16C 29/02
[52] U.S. Cl. ................................. 74/422; 74/498; 384/37
[58] Field of Search ........................ 74/422, 498; 384/37, 384/42, 38

[56] References Cited

U.S. PATENT DOCUMENTS

| | | |
|---|---|---|
| 3,499,691 | 3/1970 | Baier . |
| 3,680,443 | 8/1972 | Jenvey . |
| 4,271,716 | 6/1981 | Carduner . |
| 4,402,618 | 9/1983 | Fortmann et al. . |
| 4,475,413 | 10/1984 | Higuchi . |
| 4,515,486 | 5/1985 | Ide . |
| 4,683,769 | 8/1987 | Mochizuki et al. . |
| 4,709,593 | 12/1987 | Takeuchi . |
| 4,793,433 | 12/1988 | Emori et al. . |
| 4,936,157 | 6/1990 | Kotake et al. . |
| 4,939,947 | 7/1990 | Toyoshima et al. . |
| 5,058,448 | 10/1991 | Kiyooka et al. . |
| 5,203,216 | 4/1993 | Hasegawa . |
| 5,265,691 | 11/1993 | Konishi et al. . |
| 5,272,933 | 12/1993 | Collier et al. . |
| 5,316,043 | 5/1994 | Phillips . |

FOREIGN PATENT DOCUMENTS

| | | |
|---|---|---|
| 61-193966 | 8/1986 | Japan . |
| 6-92243 | 4/1994 | Japan . |

OTHER PUBLICATIONS

Chilton—Taurus/Sable/Continental, Suspension and Steering, 1986–89, Book 7830, p. 329.
Handbook of Engineering Mechanics, McGraw–Hill Book Company, Inc., 1962, Ch. 85, pp. 85–1–85–3.

*Primary Examiner*—Lenard A. Footland
*Attorney, Agent, or Firm*—Gifford, Krass, Groh, Sprinkle, Anderson & Citkowski, P.C.

[57] ABSTRACT

A yoke apparatus for use with a rack and pinion steering system includes a bearing disc member having a bearing surface for supporting the rack and a pair of angled outer surfaces disposed beneath the bearing surface for receiving arms of a biasing member. The biasing member includes a relief spring forming the pair of arms which are encapsulated in resilient material. The biasing member has a bottom surface with at least one recess for receiving a block portion of a support member. The arms of the biasing member compliantly urge the bearing disc into position against the rack while constraining the disc in lateral directions with respect to the housing bore.

1 Claim, 4 Drawing Sheets

YOKE APPARATUS FOR RACK AND PINION

RELATED APPLICATIONS

This patent application claims priority of U.S. provisional patent application Ser. No. 60/040,746, filed Mar. 13, 1997, and U.S. provisional patent application Ser. No. 60/043,430, filed Apr. 7, 1997.

BACKGROUND OF THE INVENTION

I. Field of the Invention

The present invention is directed to a yoke apparatus for use with a rack-and-pinion-steering system.

II. Description of the Prior Art

Automotive steering systems typically include a housing having a rack driven by a pinion gear. Rotation of a steering wheel turns the pinion gear. The pinion gear meshes with a plurality of teeth formed on the rack to drive the rack in one of two reciprocal directions. The rack in turn is connected to a pair of dirigible wheels. In addition, many automobile steering systems comprise a rotary control valve which is operable to supply pressurized fluid to move a double-acting hydraulic cylinder or actuator to assist translation of the rack.

In order to keep the teeth of the pinion gear and the rack in engagement, such steering systems employ a yoke apparatus. The yoke apparatus includes a bearing member which is biased to force the rack towards the pinion gear. The bearing member has a pair of spaced apart bearing surfaces which slidingly contact the surface of the rack opposite the teeth of the rack. The bearing member is slidingly mounted in a housing bore which is formed in a nominally orthogonal manner with reference to the rack's intended position. This results in a nominal alignment of the bearing surfaces along an axis which extends coaxially with the axis of translation of the rack. A spring is mounted in the housing bore to force the yoke apparatus against the rack and bias the bearing surfaces in order to force the teeth of the rack against the teeth of the pinion gear. Thus, the yoke apparatus operates to nominally guide the rack along the axis of translation and hold the teeth of the rack and pinion in mesh during the application of torque to the pinion gear.

In practice, it is not possible to maintain the axis of translation of the rack orthogonal to the axis of the housing bore. This is because of the tolerances involved in forming the housing bore, rack, and pinion gear. Accordingly, it has been found that the axis of translation of the rack may be angled with respect to the axis of the bearing surfaces of the bearing member, and may even undulate as a function of rotational motion of the pinion. When so misaligned, one end of each of the support surfaces engage the rack while opposite ends of the support surfaces are spaced away from the rack. As a further result, the bearing member itself may suffer angular misalignment within the bore and jam. In fact, such yoke assemblies may be said to be over constrained or to be of non-kinematic design.

For the above reasons, the rack is often held from smooth movement in one, or both, directions of travel. This is particularly so when the rack travels in a direction from the contacting ends towards the non-contacting ends of the support surface. The edges resist movement of the rack and the rack tends to hesitate and jerk in its movement. However, movement of the rack in an opposite direction tends to produce a smoother, less resistant movement. Frequently, the discontinuous or halting movement of the rack will be tactilly sensed by the driver.

The spring is located in an adjuster plug which is threadably inserted in the outer portion of the housing bore. During the assembly of the yoke apparatus, the adjuster plug is rotatably driven into contact with the bearing member with a nominal torque value of perhaps 50 in.lbs. to provide a rotational position reference. Because of the above noted tolerances involved in forming the housing bore, rack and pinion gear, there results a soft contact between the adjuster plug and the bearing member, and thus an imprecise rotational position reference. For this reason, the adjuster plug must then be backed off by an angle in the order of 30° in order to ensure interference free operation in the manner described above. This results in an indefinite stop position of the bearing member should a torque level be applied that is sufficient to overcome the spring bias.

In operation, rack and pinion assemblies are often subject to conditions known as "shock" and "rattle". Shock most often occurs when the dirigible wheels are subject to dissimilar impacts such as encountering a pothole or when crossing obliquely disposed railroad tracks or similar road surface discontinuities. One cause of shock is thought to be physical separation followed by abrupt contact between the bearing member and top surface of the adjuster plug. Rattle tends to be caused by lateral and rotational motions and resulting impacts within the housing by the yoke apparatus elements when the rack is subject to a succession of impacts when traversing an uneven surface such as a rough unpaved road or an open grassy field. In any case, shock and rattle are typically treated by tightening up various clearances or adding elastomeric guide elements, and as a last resort, by significantly increasing the biasing spring force.

SUMMARY OF THE INVENTION

Accordingly, a primary object of the present invention is to provide a yoke apparatus having a true kinematic design wherein bearing surfaces are maintained in coaxial alignment with the axis of movement of the rack to provide smooth, constant movement of the rack in both directions of travel. Another object of the present invention is to provide a yoke apparatus enabling substantially shock and rattle free operation of the rack and pinion assembly.

Accordingly, in a preferred embodiment of the present invention, an improved yoke apparatus is presented wherein a bearing disc is biased to force the rack towards the pinion gear by a spring member comprising leaf spring and lateral arm portions which is encapsulated within an elastomeric member. The bearing disc is compliantly constrained in the lateral directions with reference to the housing bore and a support member by the elastomeric member. This is accomplished by configuring the bearing disc, elastomeric member and support member such that the bearing disc is compliantly constrained from moving away from its nominal supporting position for the rack. During assembly, the adjuster plug positions the support member in order to deflect the spring member and provide the biasing force. Because the spring member is supported elastomerically, the above described over constraint is eliminated.

The elastomeric and support members are formed with interlocking features which, together with the housing bore serve to locate the elastomeric member in a preferred position with reference to the bearing disc. Specifically, the bearing disc is located laterally within angled arms of the elastomeric member and other interlocking features of the elastomeric member, and biasingly toward the rack by an angled shoulder of the elastomeric member compliantly engaging a conical surface of the bearing disc. This serves to locate the elastomeric member and support member in a direction parallel to the axis of translation of the rack. As the adjuster plug is positioned, the arms and angled shoulder of the elastomeric member deform as the spring member is being deflected.

In operation, the bearing disc initially moves with the rack. Because of this, no initial Coulomb friction is possible. Further, the deformation of the angled shoulder is altered during the initial motion such that a contra-pitch rotation of the bearing disc results. This, in turn, opens a hydrodynamic bearing wedge for lubricant. As a result, exceptionally smooth operation results because the bearing surfaces of the bearing disc compliantly align with the preferred axis of movement of the rack in a manner that provides enhanced lubrication.

BRIEF DESCRIPTION OF THE DRAWINGS

The foregoing and other objects and advantages of the present invention will become readily apparent to those skilled in the art upon studying the following detailed description, when considered in connection with the accompanying drawings, in which.

DETAILED DESCRIPTION OF THE PREFERRED EMBODIMENTS

Figure 1:
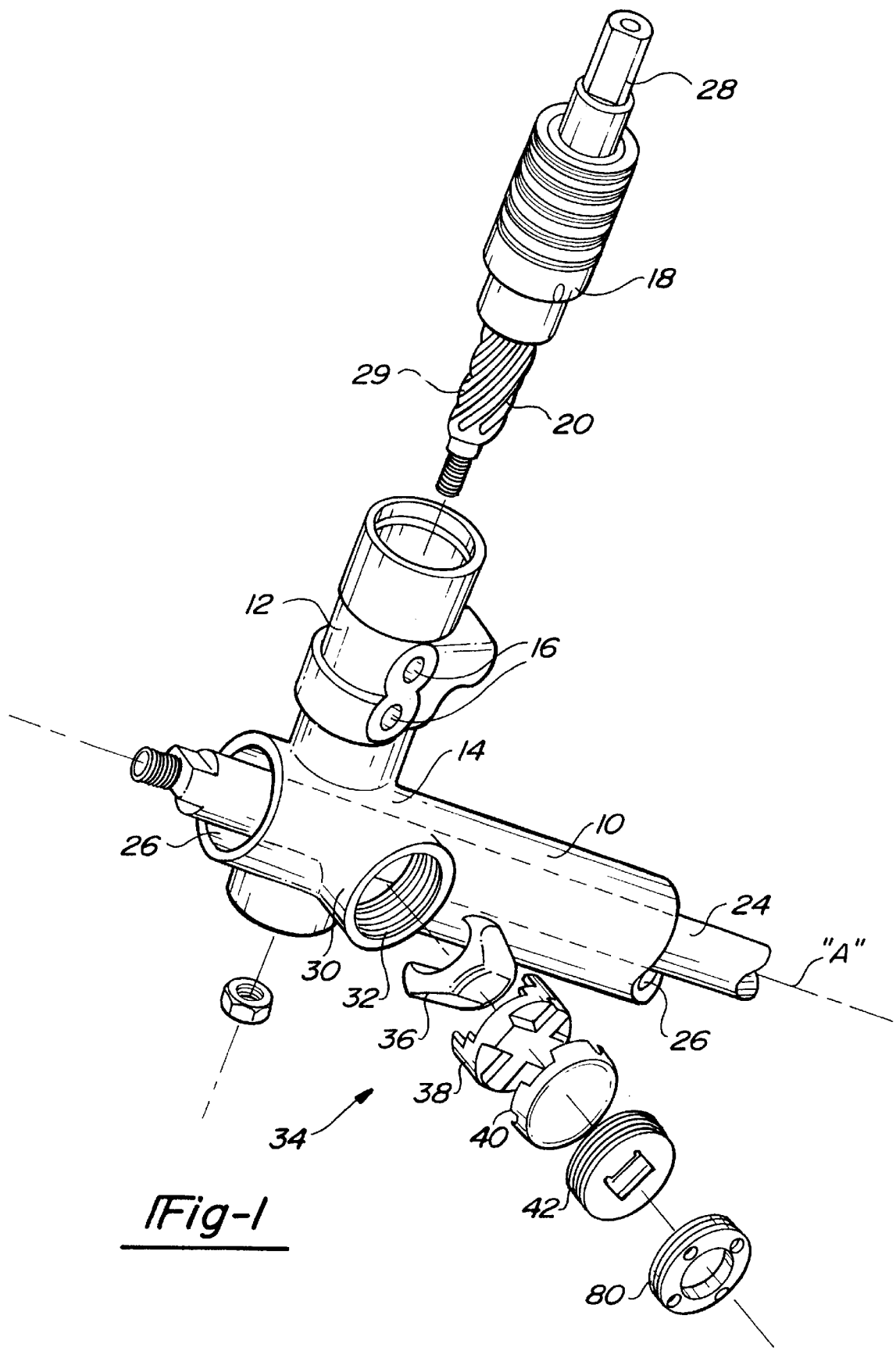
FIG. 1 is an exploded perspective view of a steering gear assembly including a yoke apparatus configured in accordance with a preferred embodiment of the invention.

Referring now to the exploded perspective view of FIG. 1, thereshown is a portion of a steering apparatus for a vehicle. The steering apparatus includes a conventional housing 10, such as manufactured by the Saginaw Steering Systems Division of Delphi Automotive Systems, of Saginaw, Mich. The housing includes a barrel 12 extending upwardly from a cylinder 14. The barrel 12 houses a rotary control valve assembly 18 for providing pressurized hydraulic fluid through ports 16 to a hydraulic actuator (not shown) for providing hydraulic assist to the steering system. Included in the rotary control valve assembly 18 is a pinion gear 20. The pinion gear 20 is mounted to mesh with a plurality of teeth 22 (FIGS. 2 and 3) of a rack 24. The rack 24 is mounted for reciprocal movement along an axis of translation "A" in an elongated cavity 26 of the housing 10. As is known in the art, input shaft 28 of the rotary control valve assembly 18 is connected to a steering wheel (not shown) to enable steering of a host vehicle.

Figure 2:
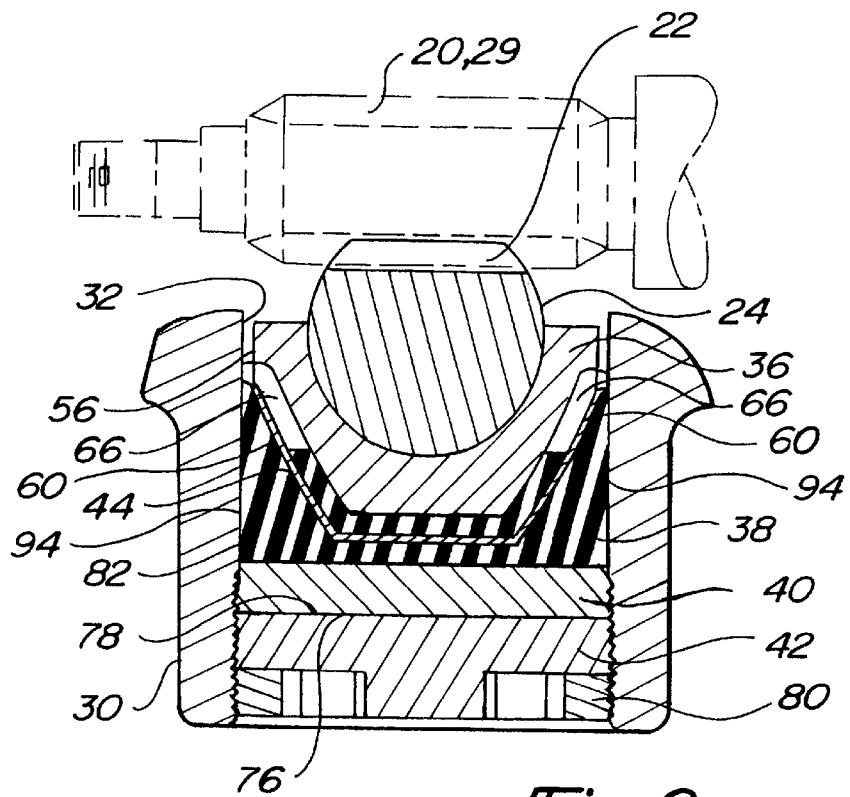
FIG. 2 is a sectional view of the yoke apparatus of the preferred embodiment of the invention.
Figure 3:
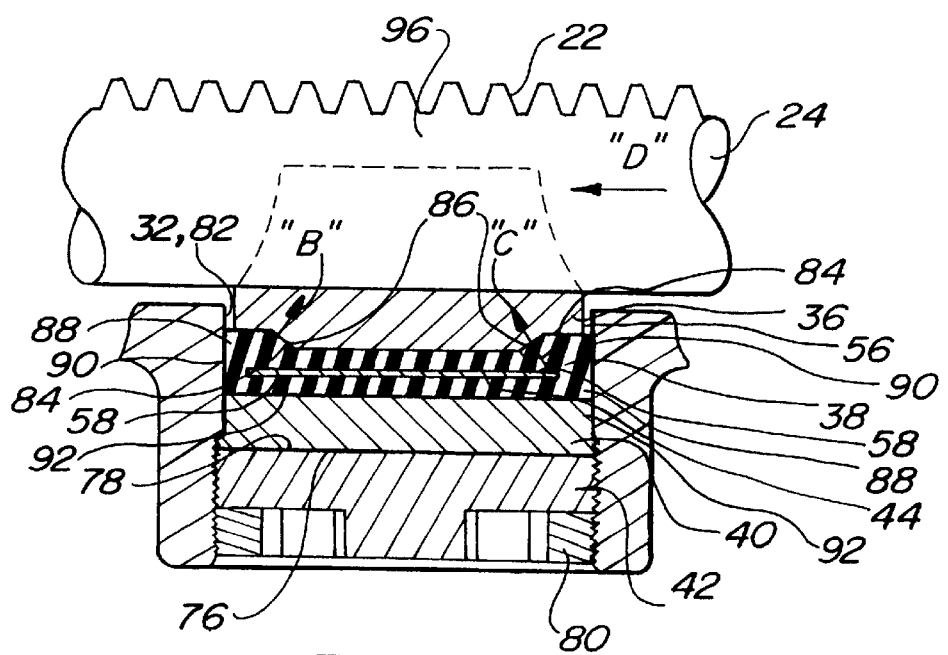
FIG. 3 is another sectional side view of the yoke apparatus of the preferred embodiment of the invention.

As shown in FIGS. 2 and 3, the teeth 22 extend in a nominally axial direction along the surface of the rack 24. The teeth 22 are formed to mesh with a plurality of teeth 29 formed on the pinion gear 20 so that rotational movement of the pinion gear 20 by the steering wheel and rotary control valve assembly 18 will cause reciprocal translation of the rack 24 along the axis of translation "A". As is known in the art, the rack 24 is connected to dirigible wheels (also not shown) to steer the vehicle.

As shown in FIG. 1, a cylindrical sleeve 30 is formed on one side of the cylinder 14 of the housing. The cylindrical sleeve 30 includes a threaded aperture 32 for accepting an improved yoke apparatus 34 for biasingly supporting engagement of the teeth 22 with the pinion gear 20 in accordance with a preferred embodiment of the present invention. The threaded aperture 32 extends in a substantially orthogonal direction with reference to the axis of translation "A" of the rack 24.

The improved yoke apparatus 34 includes a bearing disc 36, an elastomeric member 38, a support member 40 and an adjuster plug 42. When the improved yoke apparatus 34 is assembled within the cylindrical sleeve 30, the bearing disc 36 is biased against the rack 24 by elastic deformation of a spring member 44 which is encapsulated within the elastomeric member 38 as is more clearly depicted in FIGS. 2 and 3.

Figure 6:
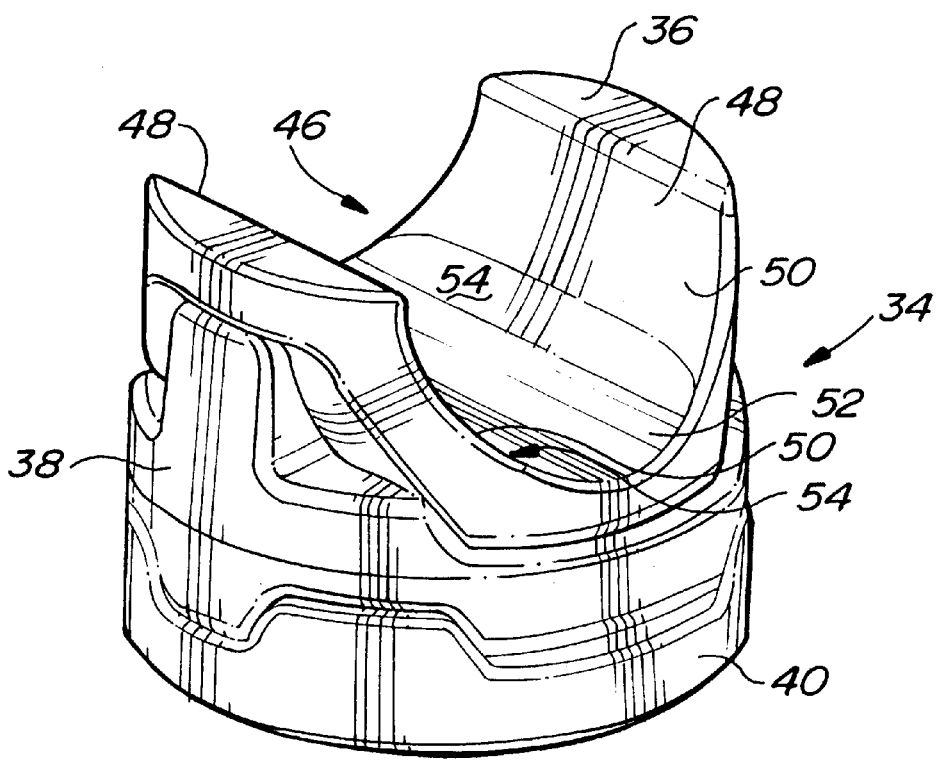
FIG. 6 is a perspective view of the yoke apparatus of the preferred embodiment of the invention.
Figure 5:
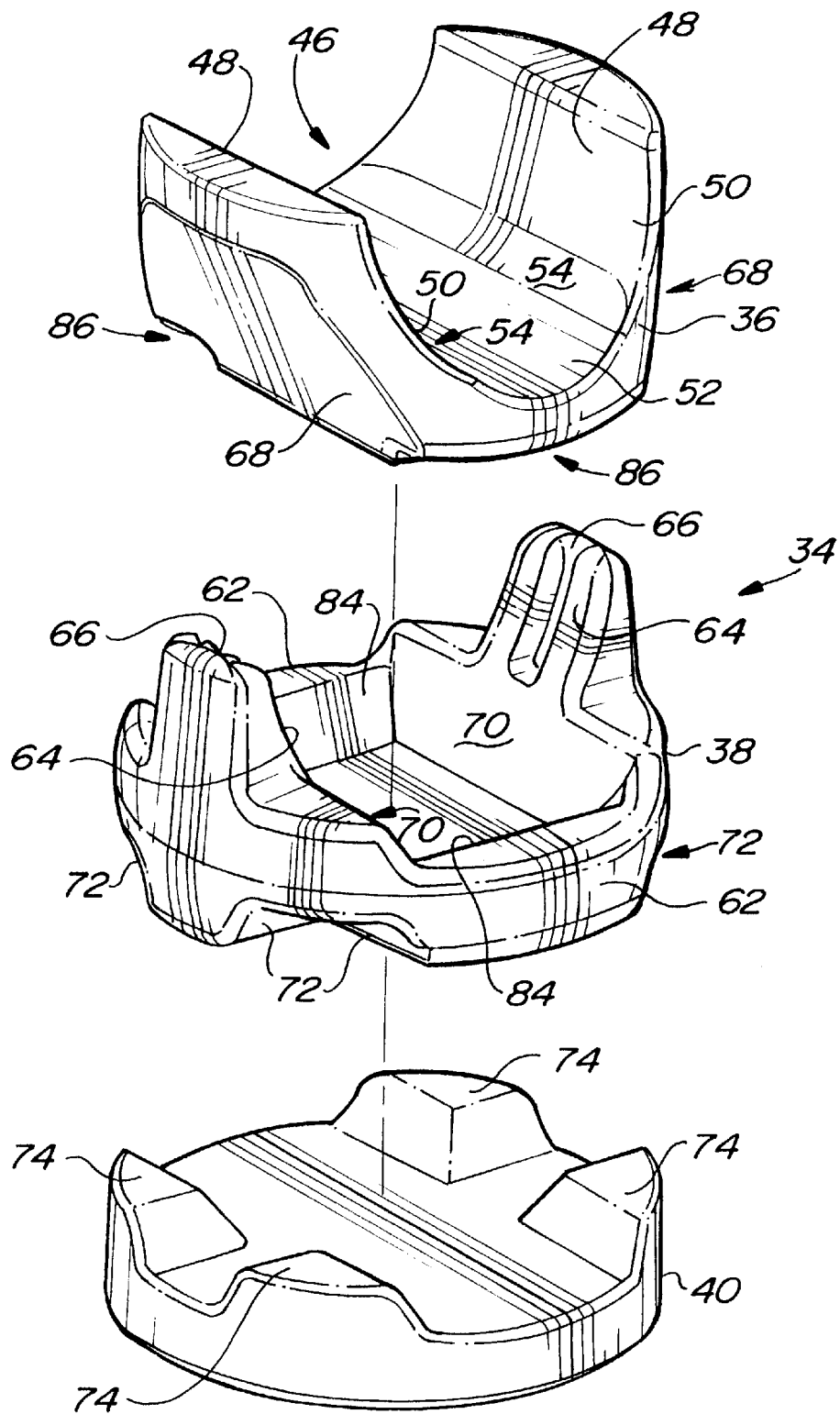
FIG. 5 is an exploded perspective view of the yoke apparatus of the preferred embodiment of the invention.

As clearly depicted in the exploded perspective and perspective views of the yoke apparatus 34 respectively shown in FIGS. 5 and 6, one side of the bearing disk 36 has a curvilinear slot 46 defining a pair of arms 48. The slot 46 is formed as a curvilinear surface 50 the center region of which is relived by offset smaller curvilinear surface 52 such that the rack 24 is supported by a pair of elongated bearing surfaces 54. The bearing surfaces 54 are spaced apart to guide the rack 24 during movement thereof. As more clearly shown in FIGS. 2 and 3, the bearing disc 36 has a circumferential outer surface 56 having a diameter slightly less than the threaded aperture 32 of the cylindrical sleeve 30. The diametral operating clearance so obtained precludes the possibility of contact between the bearing disc 36 and the threaded aperture 32 and eliminates any possibility of rattle from that source.

Figure 4:
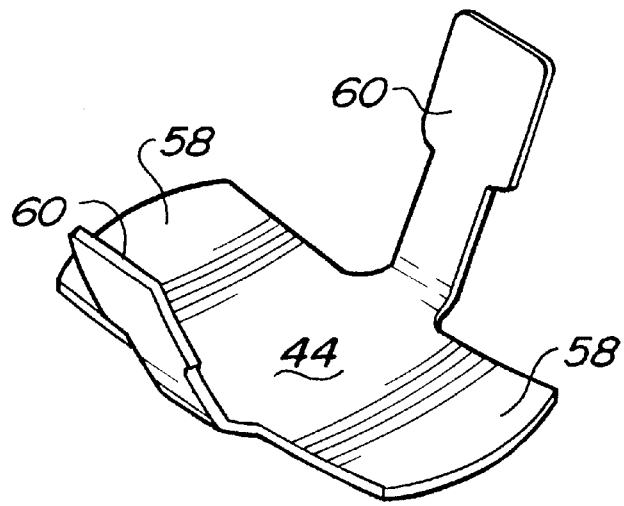
FIG. 4 is a perspective view of a spring member comprised in the yoke apparatus of the preferred embodiment of the invention.

As shown in FIG. 4, the spring member 44 comprises leaf spring and lateral arm portions 58 and 60, respectively, each formed in a curvilinear manner. As shown in FIG. 5, the elastomeric member 38 comprises main body and arm portions 62 and 64, respectively, each formed in a complimentary curvilinear manner with reference to the encapsulated spring member 44.

Elastomeric member 38 is typically formed in a molding operation. During this molding operation it is necessary to support spring member 44 in its proper location within the elastomeric member 38. Central cavities 66 are formed in the arm portions as a result of utilizing mold positioning ribs (not shown) for this purpose.

Angled planar surfaces 68 of the bearing disc are configured for lateral and rotational location within angled wall portions 70 of the elastomeric member 38. In addition, female reliefs 72 are formed directly below the angled wall portions 70 and are configured for receiving corner blocks 74 of the support member 40 in an interlocking manner.

During assembly of the yoke apparatus 34, the adjuster plug 42 is threadably inserted into threaded aperture 32 and rotatably driven until surface 76 thereof contacts bottom surface 78 of the support member 40. A nominally linearly increasing driving torque is required as the adjuster plug 42 is rotatably driven further and the spring member 44 is elastically deformed. This continues until the center regions of the bearing disc 36, the elastomeric member 38 and the support member 40 concomitantly contact one another and an abrupt increase in the measured torque is detected. At this point an internal lock nut 80 is tightened against the adjuster plug 42 to maintain its position.

During assembly, elastic deformation of leaf spring and lateral arm portions 58 and 60, respectively, of the spring member 44 causes selective deformation of the elastomeric member 38 and biased contact between it and portions of the bearing disc 36, support member 40 and smooth portion 82 of the threaded aperture 32. For instance, angled shoulders 84 of the elastomeric member 38 are progressively deformed by conical surfaces 86 of the bearing disc 36. This causes end portions 88 of the elastomeric member 38 to forcibly contact juxtaposed regions 90 of the smooth portion 82 of the threaded aperture 32, and 92 of the support member 40. In addition, concomitant compliant contact between arms 48 and regions 94 of the smooth portion 82 of the threaded aperture 32 occurs as the lateral arm portions 60 of the spring member 44 are elastically deformed.

In operation, lateral and/or downward shock and rattle loading is imposed upon the improved yoke apparatus 34 by external forces applied to the rack 24. The bearing disc 36 is supported against such shock and rattle loading by the elastomeric member 38. This is primarily achieved via further elastomeric deformation of the elastomeric member 38 with reference to its constrained position between the bearing disc 36, support member 40 and the smooth portion 82 of the threaded aperture 32. With reference to the suppression of downward shock, this particularly includes the contacting center regions of the bearing disc 36, the elastomeric member 38 and the support member 40.

Because of the biased contact between angled shoulders 84 and conical surfaces 86, the bearing disc 36 is biased against the rack 24 by angled forces as indicated by offset arrows "B" and "C". Upon initial translational motion of the rack 24 in the direction indicated by arrow "D", the bearing disc 36 begins to move along with the rack 24. This provides an offset in the relative positions of the bearing disc 36 and support member 40 which tends to increase force in the direction of arrow "B" and decrease force in the direction of arrow "C". If the translational motion of the rack 24 were in the opposite direction then the force variations would be opposite as well. In either case, the end result is a contra-pitch rotation of the bearing disc 36 about an apex 96 so as to form a lubrication wedge between it and the rack 24. The kinematic design of the improved yoke apparatus 34 permits the axis of the bearing surfaces 48 of the bearing disc 36 to be in precise alignment with the rack 24 and maintain a lubrication wedge therebetween which enables smooth movement of the rack 24.

Accordingly, disclosed above is an improved yoke apparatus of compact design which may be substituted for a conventional yoke apparatus in any rack and pinion steering gear to substantially eliminate shock and rattle as described above, and further, to significantly improve its smoothness of operation. The ideally supported bearing disc 36 permits perfect alignment and improved lubrication of its support surfaces of the otherwise conventional steering system's rack 24. Accordingly, the rack 24 moves smoothly in either direction with minimal hysteresis due to Coulomb friction.

I claim:

1. A yoke apparatus for maintaining a rack and pinion in meshing engagement, said rack movable within a housing having a bore formed along an axis which is orthogonal to a translation axis of said rack, said apparatus comprising:

a bearing disc member having a bearing surface for guiding said rack, said bearing having a pair of angled outer surfaces spaced apart from said bearing surface;

a biasing member having a pair of lateral arms encapsulated within an elastomeric material, said lateral arms positioned to receive said outer surface of said disc member therebetween, said biasing member having a relief cavity located on a bottom surface; and a support member having a block portion adapted to be received in said relief cavity of said biasing member.

* * * * *